United States Patent [19]
Sygo

[11] Patent Number: 5,899,016
[45] Date of Patent: May 4, 1999

[54] DEVICE FOR TRAPPING RODENTS

[76] Inventor: Gerhard E. Sygo, 317 Lyndeview Drive, Whitby, Ontario, Canada, L1N 3A5

[21] Appl. No.: 08/861,633

[22] Filed: May 22, 1997

[51] Int. Cl.⁶ .................................................. A01M 23/02
[52] U.S. Cl. ...................................................... 43/62
[58] Field of Search .................... 43/81, 82, 62

[56] References Cited

U.S. PATENT DOCUMENTS

| | | | |
|---|---|---|---|
| 434,751 | 8/1890 | Anderson | 43/81 |
| 1,974,706 | 9/1934 | Fay | 43/81 |
| 2,311,490 | 2/1943 | Turpan | 43/81 |
| 2,794,291 | 6/1957 | Tremblay | 43/81 |
| 3,031,793 | 5/1962 | Waterman | 43/81 |
| 3,394,488 | 7/1968 | Kruger . | |
| 3,430,380 | 3/1969 | Poff | 43/81 |
| 4,245,423 | 1/1981 | Souza et al. . | |
| 4,297,805 | 11/1981 | Kness et al. . | |
| 4,363,183 | 12/1982 | Drdlik . | |
| 4,711,049 | 12/1987 | Kness . | |
| 4,991,340 | 2/1991 | Schildt . | |
| 5,259,152 | 11/1993 | Taylor . | |

OTHER PUBLICATIONS

Data Base Seapur Printout "May 28, 1996—File 621".
Data Base Seapur Printout "May 28, 1996—File 192".
Data Base Seapur Printout "File 621".

*Primary Examiner*—Thomas Price
*Attorney, Agent, or Firm*—James E. Gastle

[57] ABSTRACT

Disclosed herein is a device to trap a rodent comprising spring biased trap movable from a first ready position to a second operational position to confine a rodent, retainer device to retain the trap in the first ready position under the action of a downward retaining force, the retainer device being arranged to receive a bait element, the retainer device being further arranged so that the downward retaining force is equivalent to and provided by the weight of the bait element.

18 Claims, 15 Drawing Sheets

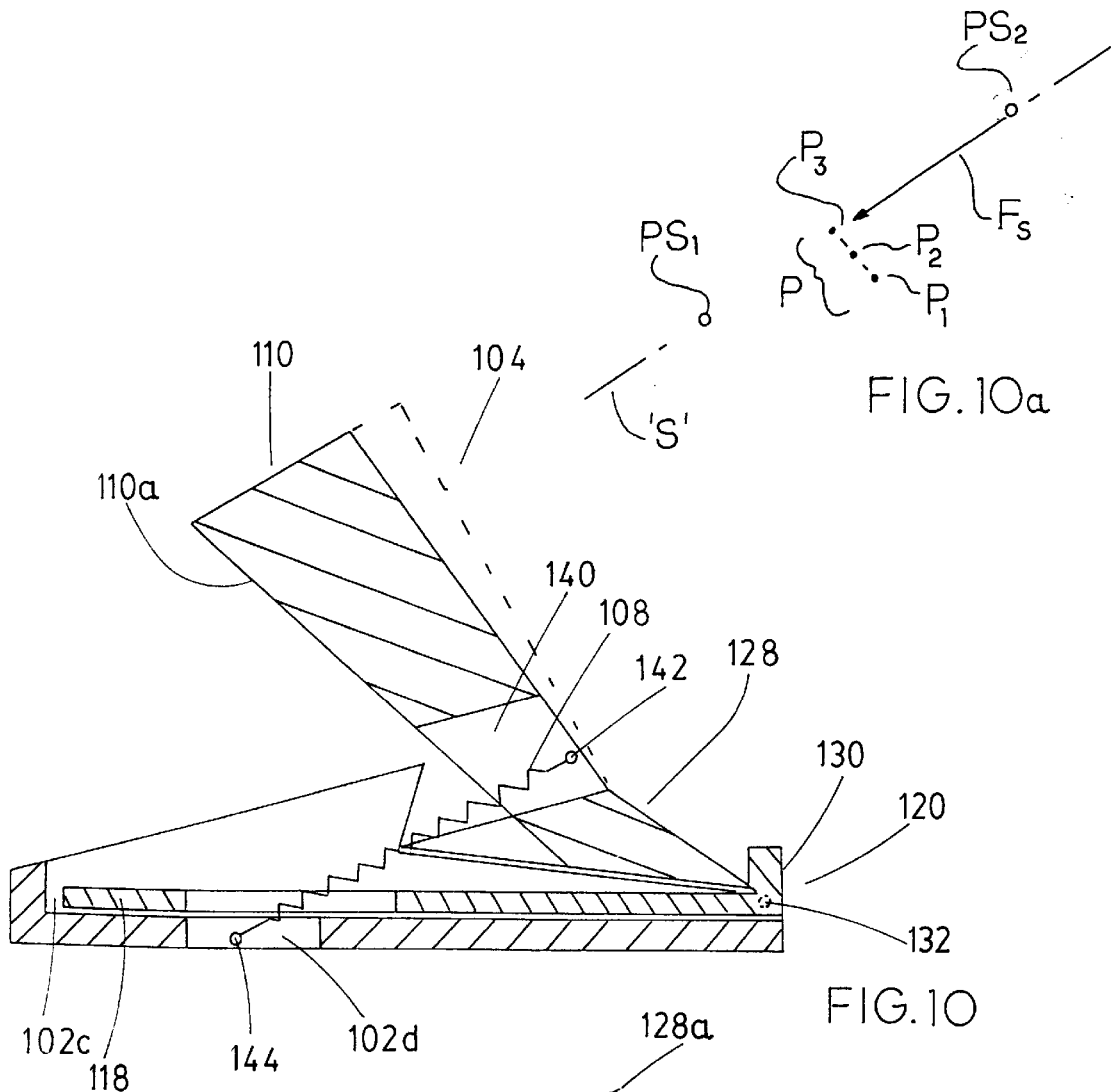
FIG. 10a
FIG. 10
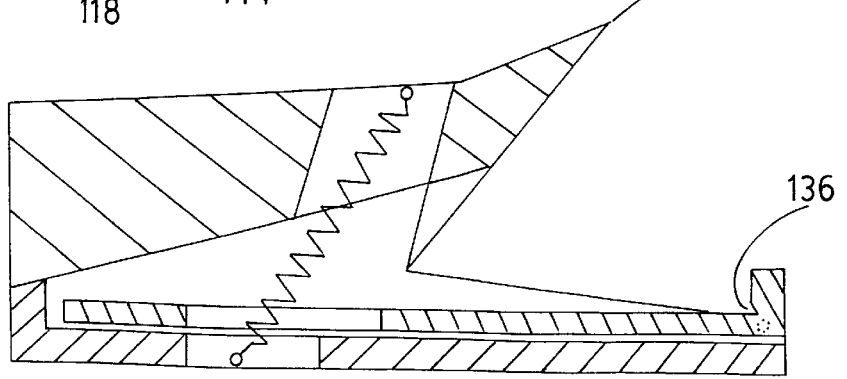
FIG. 11

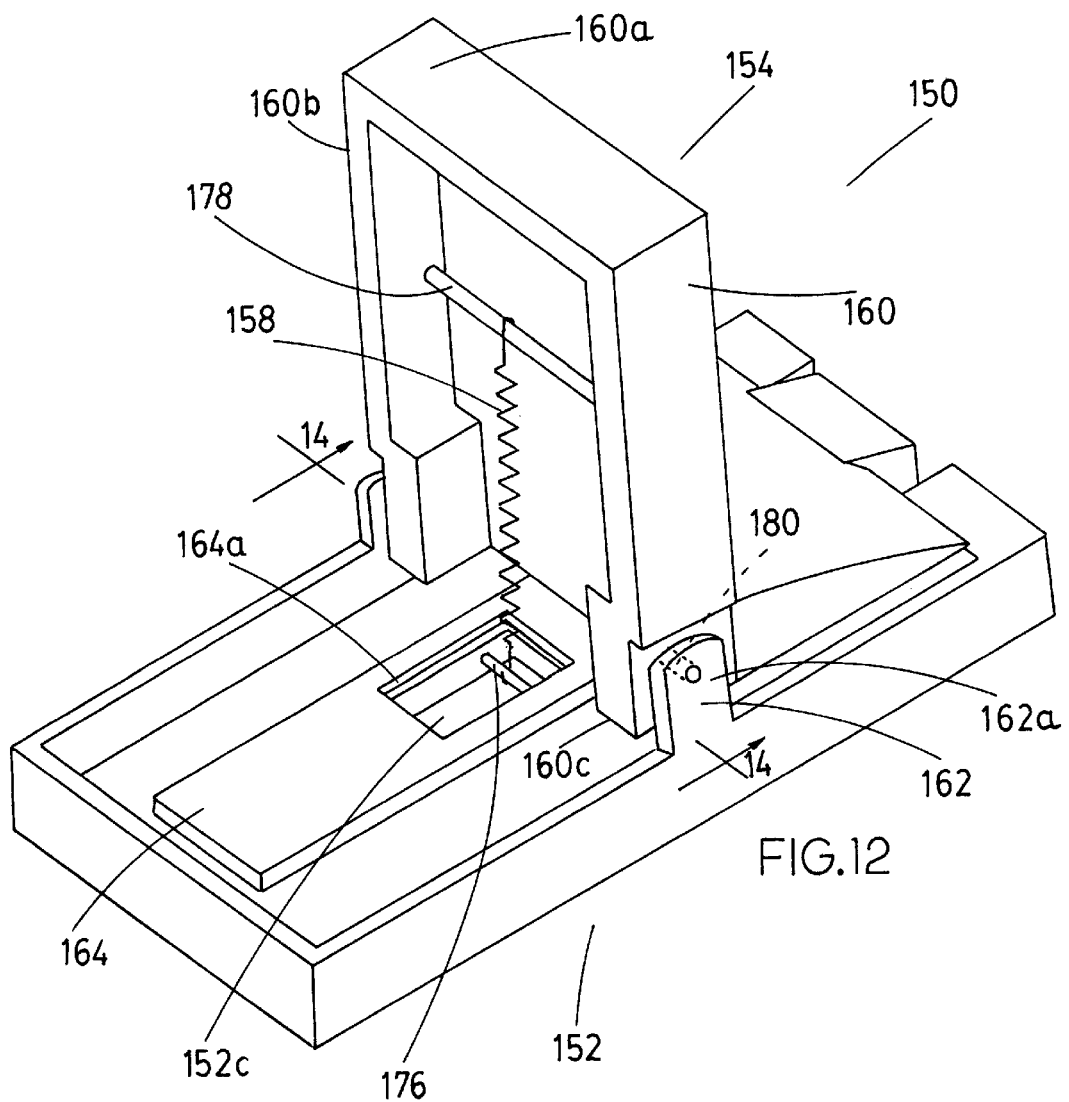
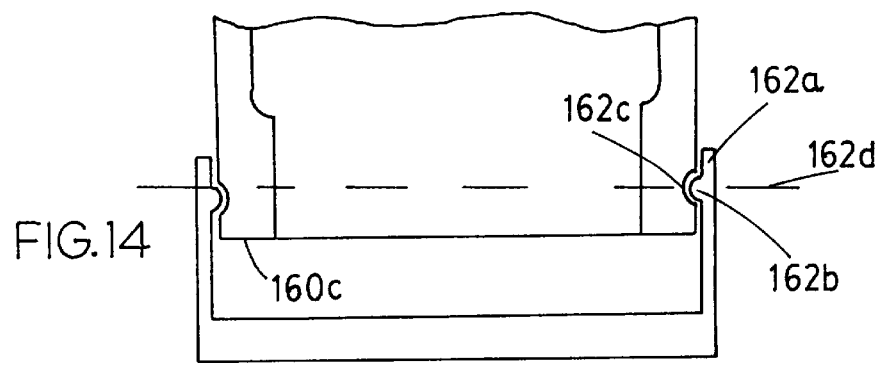

5,899,016

DEVICE FOR TRAPPING RODENTS

BACKGROUND OF THE INVENTION

1. Field of the Invention

The present invention relates to rodents and more particularly to methods and devices to trap rodents in a safe and dependable manner.

2. Description of the Related Art

Rodent trapping devices, such as those referred to as mouse traps, are common household tools and come in several forms including the popular version sold under the trademark VICTOR. Though these conventional mouse traps are satisfactory, there are instances where the rodent seems to manage to steal the bait without tripping the trap. This is due to the fact that the rodent, in all cases, must be depended upon to displace a trigger. Herein lies the problem—the mouse can sometimes remove or partially consume the bait without actually displacing the trigger.

It is an object of the present invention to provide a novel device which will obviate these difficulties.

SUMMARY OF THE INVENTION

Briefly stated the invention involves a device to trap a rodent comprising spring biased trap means movable from a first ready position to a second operational position to confine a rodent, retainer means to retain the trap means in the first position under the action of a downward retaining force, the retainer means being arranged to receive a bait element, the retainer means being further arranged so that the downward retaining force is equivalent to and provided by the weight of the bait element.

In another aspect of the present invention, there is provided a device to trap a rodent, comprising:

a base;

trap means movable relative to the base from a first ready position to a second operational position in abutment with the base at a target location thereon, thereby to confine an animal between the trap means and the base;

spring means for biasing the trap means toward the second operational position; the spring means being further arranged to reduce the bias to zero when the trap means is at a theoretical zero position beyond the first ready position and opposite the second operational position;

retainer means for retaining the trap means at the first ready position; the retainer means further including locating means positioned near the target for locating a bait element for the rodent, whereby displacement of the bait element causes the retainer means to release the trap means to cause the trap means to travel toward the second operational position under the biasing force of the spring means.

In still another aspect of the present invention, there is provided a method of trapping a rodent comprising the steps of:

providing a spring biased trap member movable from a first ready position to a second operational position to confine a rodent, providing a retainer to retain the trap element in the first position under the action of a downward retaining force, arranging the retainer to receive a bait element, wherein the downward retaining force is equivalent to and provided by the weight of the bait element.

BRIEF DESCRIPTION OF THE DRAWINGS

Several preferred embodiments of the present invention will now be described, by way of example only, with reference to the appended drawings in which:

FIG. 10 is a sectional view taken on line 10—10 of FIG. 9 and with the device in a first ready position;

FIG. 10a is a schematic diagram of relative pivot points for the device illustrated in FIG. 8;

FIG. 11 is a sectional view according to FIG. 10 with the device in a second operational position;

FIG. 12 is a perspective view of still another device to trap a rodent;

FIG. 14 is a sectional view taken on line 14—14 of FIG. 12;

DESCRIPTION OF THE PREFERRED EMBODIMENTS

Figure 1:
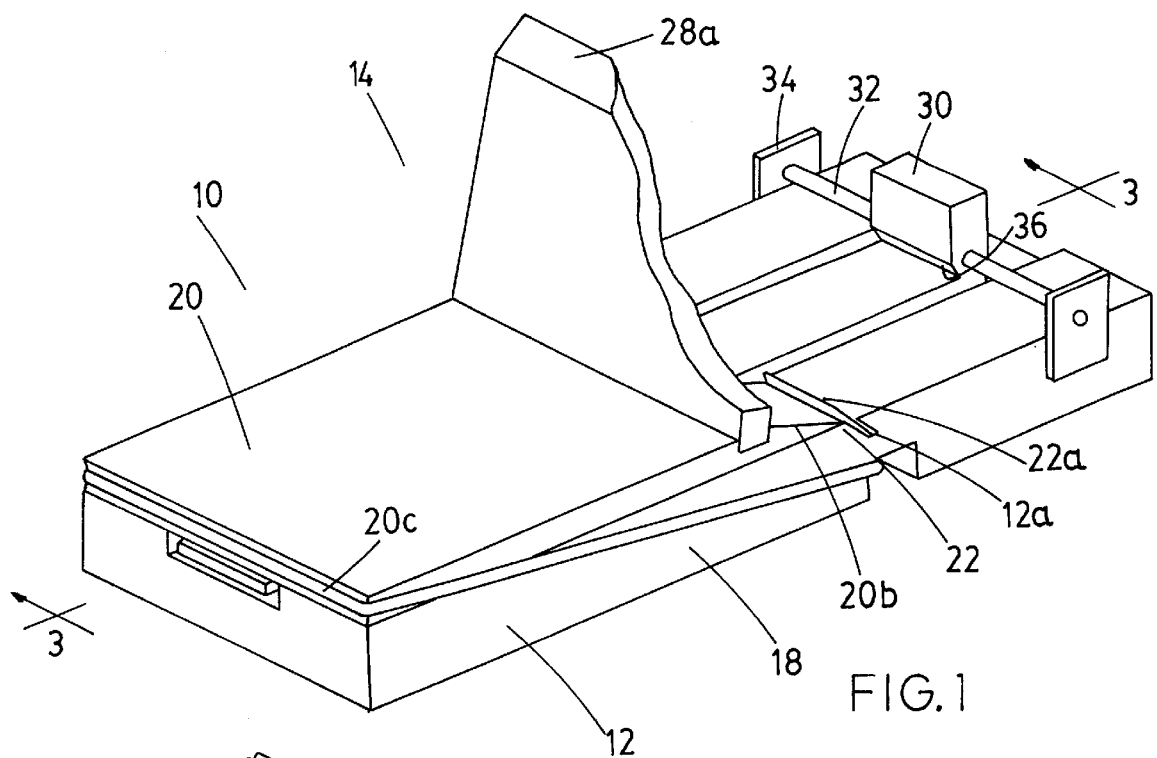
FIG. 1 is a fragmentary perspective view of a device to trap a rodent.
Figure 2:
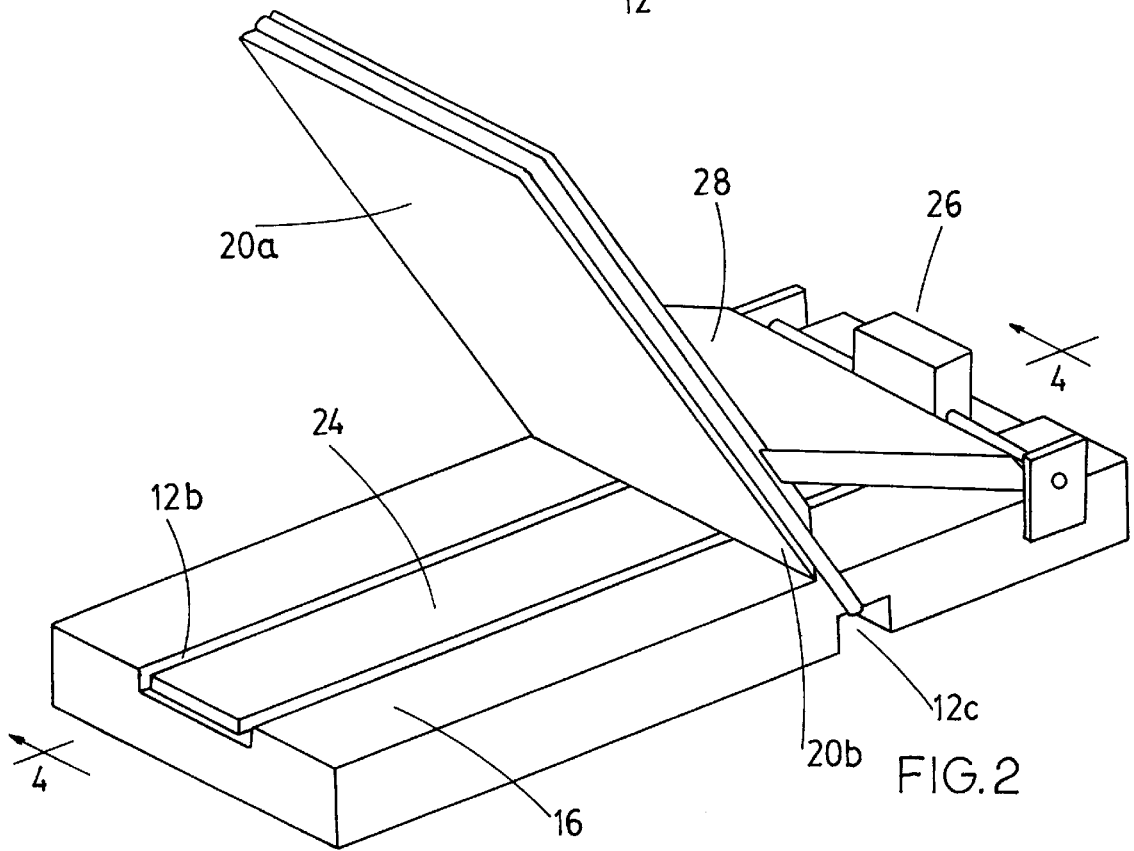
FIG. 2 is a perspective view of the device of FIG. 1 in another configuration.
Figure 3:
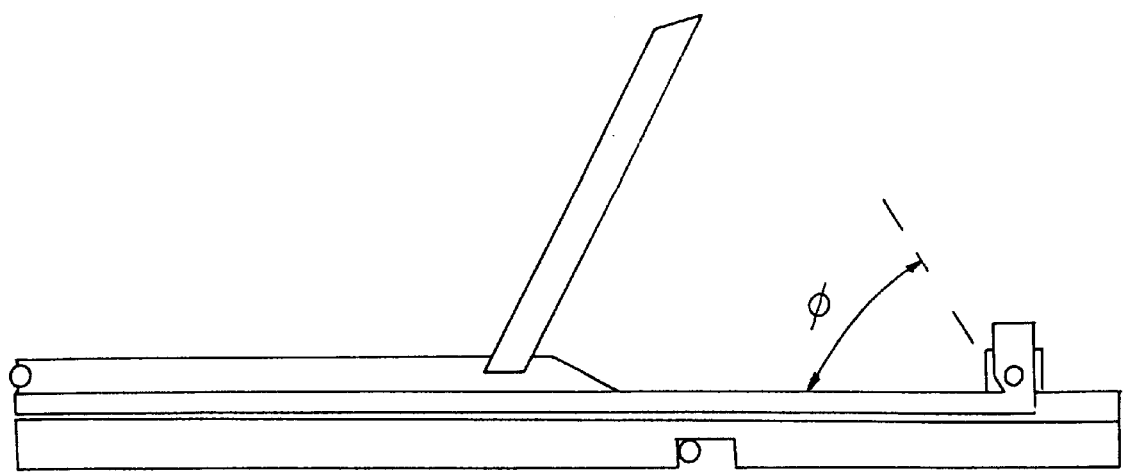
FIG. 3 is a sectional view taken on line 3—3 of FIG. 1.
Figure 4:
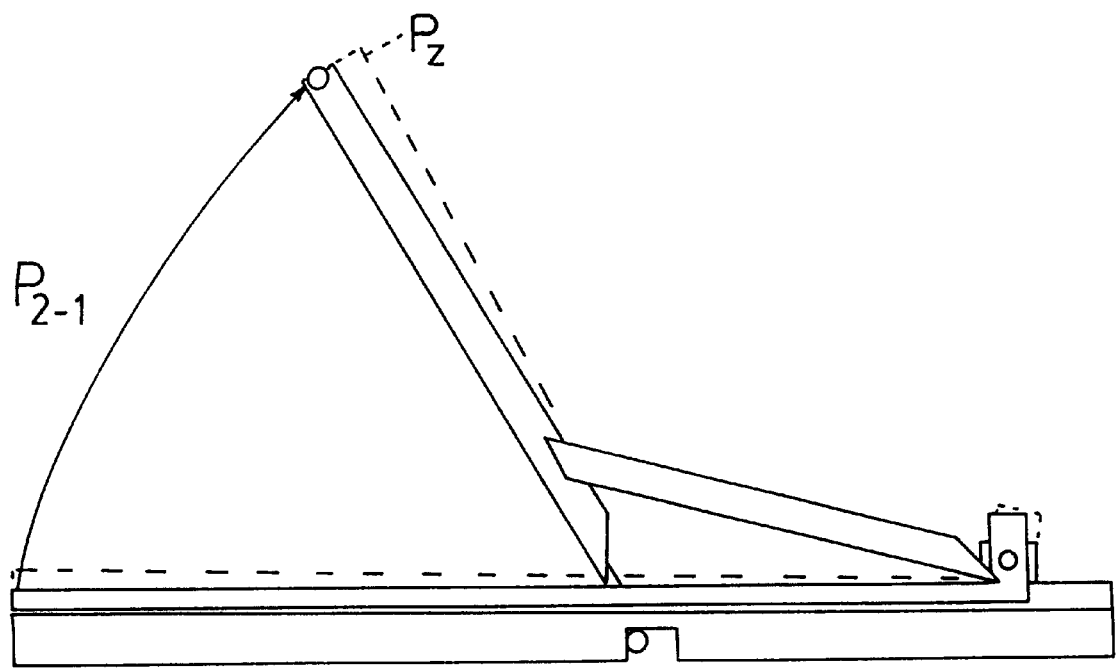
FIG. 4 is a sectional view taken on line 4—4 of FIG. 2.

Referring to FIGS. 1 to 4, there is provided a device 10 to trap a rodent, comprising a base 12 and a trap means generally shown at 14 movable relative to the base from a first ready position shown in FIG. 2 to a second operational position in abutment with the base at a target location thereon and as shown in FIG. 1, thereby to confine an animal between the trap means and the base.

A spring means is generally shown at 18 in the form of a tension spring to provide a spring bias for biasing the trap means toward the second operational position. The tension spring is further arranged to reduce the bias exerted on the trap means from a maximum level when the trap means is at the second operational position toward a minimum when the trap means is at the first ready position. The bias exerted on the trap means in the first ready position is not 'zero' but rather is sufficiently reduced so as to be equal to a relative small retaining force to be provided by a single bait element as will be described.

To explain this further, the spring means is arranged to reduce the bias to zero at a theoretical 'zero' position which is near the first ready position but just beyond the path between the second operational position and the first ready position.

The trap means includes a trap member 20 in the form of a first panel defining a plane to be substantially parallel with the base in the second operational position. The trap member has a first surface 20a to engage the base in the second operational position and includes a pivot means generally shown at 22 to pivot the trap member between the first ready and second operational positions relative to a pivot axis. The pivot means is provided by a first edge portion on the trap member as shown at 20b which engages a pair of pivot plates 22a positioned in transverse slots 12a formed in the base 12.

A retainer means is also provided for retaining the trap means at the first ready position. The retainer means further includes locating means which in this case includes a locating paddle 24 which is positioned in a longitudinal slot 12b in the base and in the region of the target for locating a bait element for the rodent.

The retainer means further includes a retaining formation 26 and the trap member has a latch formation including a second panel, namely a latch member 28, which extends upwardly from a second surface of the trap member to engage the retaining formation when the trap member is in the first ready position. The retaining formation 26 is in the form of a trigger block 30 which is joined to the rear end of the locating paddle 24 and is pivoted to the base by way of a pivot rod 32 extending transversely across the base and rotatably coupled by way of a pair of mounting flanges 34. The pivot rod extends through a passage in the trigger block 30 and positions the block centrally in the longitudinal slot 12b.

The trigger block 30 has a surface which faces the latch member 28 and which is inwardly bevelled to form a notch 36 which is complementary with a similarly bevelled edge 28a on the latch member. In this manner, the trigger block 30 is pivoted to the base 12 between a load position in solid lines in FIG. 4 to engage the latch and retaining formations and a release position in dashed lines in FIG. 4 to disengage the latch and retaining formations.

The trap member 20 is further provided with a second edge portion 20c opposite the first edge portion 20b and which is shaped with a recess whose radius is selected according to the radius of the tension spring 18 so that the tension spring can be seated therein. Similarly, the base 12 has a transverse slot 12c to receive the tension spring. With the tension spring in the form of a loop. The tension spring is stretched between the second edge portion 20c and the transverse slot 12c.

It will further be understood that the orientation of the tension spring relative to the trap member 20 will determine the force that the spring delivers thereto. Desirably, the spring is misaligned with the trap member in the first ready position just enough to provide a residual force to displace the trap member toward the target, whereas in the theoretical zero position described earlier and shown in dashed lines in FIG. 4, the spring is aligned with the trap member thereby having no component of force acting in the direction of the target.

In use, the device 10 is assembled in the manner described above and the trap member 20 is raised to its first ready position as shown in FIG. 2. To do so, the latch member 28 is rotated rearwardly until the bevelled edge 28a engages the notch 36. As the edge 28a passes into the notch, there will be a very slight upward movement of the locating paddle as the edge 28a brushes past the upper extremity of the notch 36 and then settles back down as the edge 28a is fully engaged by the notch 36. A bait element is then placed on the locating paddle near its remote end in readiness for an approaching rodent. The bait element should have a weight capable of delivering a sufficient downward force on the locating paddle to overcome the upward force thereon by the spring as it urges the edge 28a of latch member 28 out of the notch 36.

A particular feature of the device 10 is its sensitivity to attempts by rodents to steal the bait element from the device or to consume the bait element 'in-situ', in other words, to consume the bait element while the bait element remains in place on the locating paddle. Should the bait element be removed from the locating paddle or be partially or totally consumed by the rodent in-situ, the downward force provided by the bait element will be reduced or removed entirely causing the upward force by the spring to urge the locating paddle upwardly and thus the edge 28a of latch member 28 out of the notch 36. Thus, removal or consumption of the bait element by the rodent causes the retainer means to release the trap member to cause the trap means to travel toward the second operational position under the biasing force of the tension spring. The key is that the rodent need not actually displace the locating paddle to cause the device to trigger, but rather the triggering action of the device is based on the removal of the bait element from the locating paddle or the partial consumption of the bait element in-situ. It should be understood that the trigger is arranged to carry a minimum predetermined weight of the bait element thereby to maintain the trigger in position. The predetermined weight should depend on the design parameters or dimensions of the components of the device including the spring rate of the spring and should be a weight sufficiently small for the desired rodent to be able to carry or at least move off the locating paddle, for example in the order of a few grams.

In this manner, the device 10 provides device to trap a rodent comprising spring biased trap means movable from a first ready position to a second operational position to confine a rodent, retainer means to retain the trap means in the first ready position under the action of a downward retaining force, the retainer means being arranged to receive a bait element, the retainer means being further arranged so that the downward retaining force is equivalent to and provided by the weight of the bait element.

It will be understood from the above description that there are a number of variables that can affect the size of the retaining force and the manner in which the retaining force is exerted on the trap member. For example, the retaining force can be influenced by the included angle of the notch as shown by angle φ in FIG. 3. The smaller the angle, the lighter the bait element needed to maintain the trap member in position. It follows that the weight of the locating paddle also contributes to the retaining force. It may be desirable to minimize the weight of the locating paddle so that it contributes only a fraction of the total retaining force exerted by the 'bait-loaded' locating paddle. The position of the trap member relative to the theoretical zero position will influence the retaining force need to maintain the trap member in its first ready position. For example, moving the first ready position further toward the second operational position will increase the distance of the trap member from the theoretical zero position and therefore increase the needed retaining force.

Figure 5:
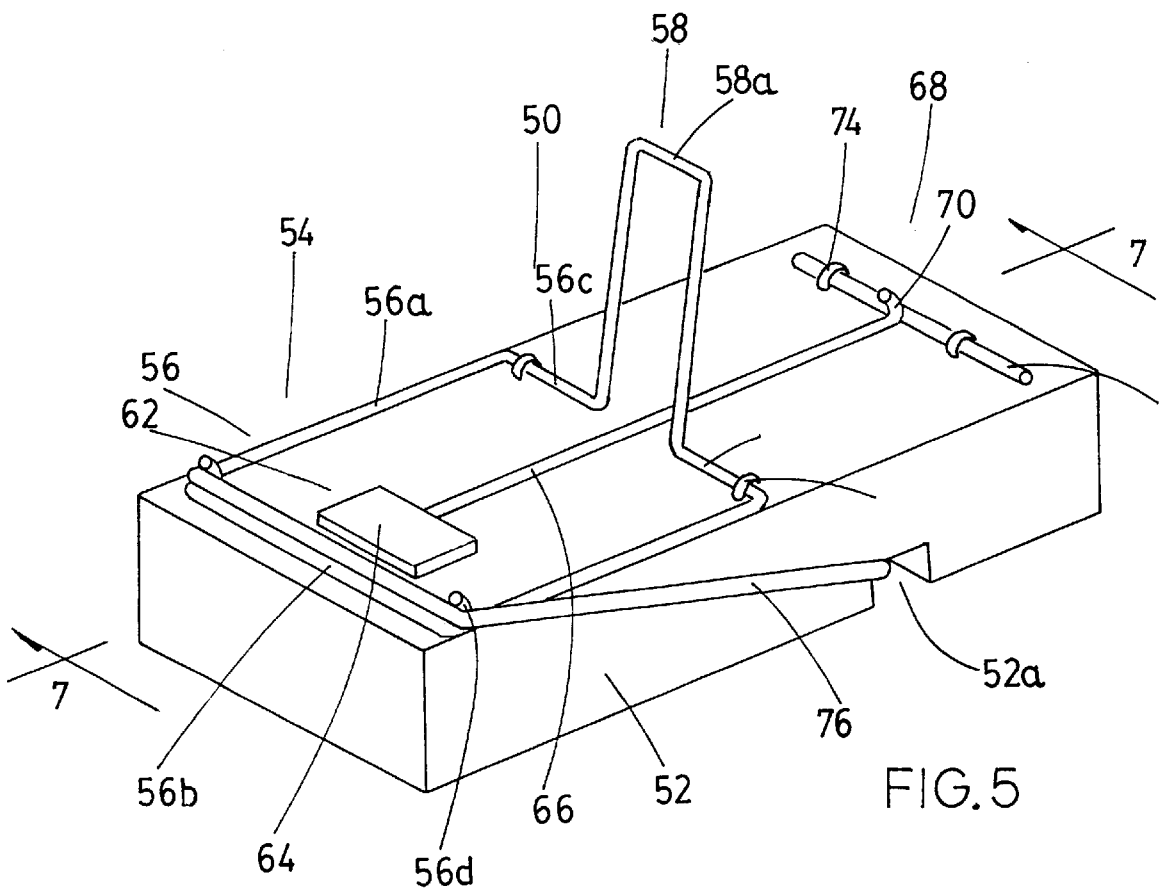
FIG. 5 is a perspective view of another device to trap a rodent.
Figure 6:
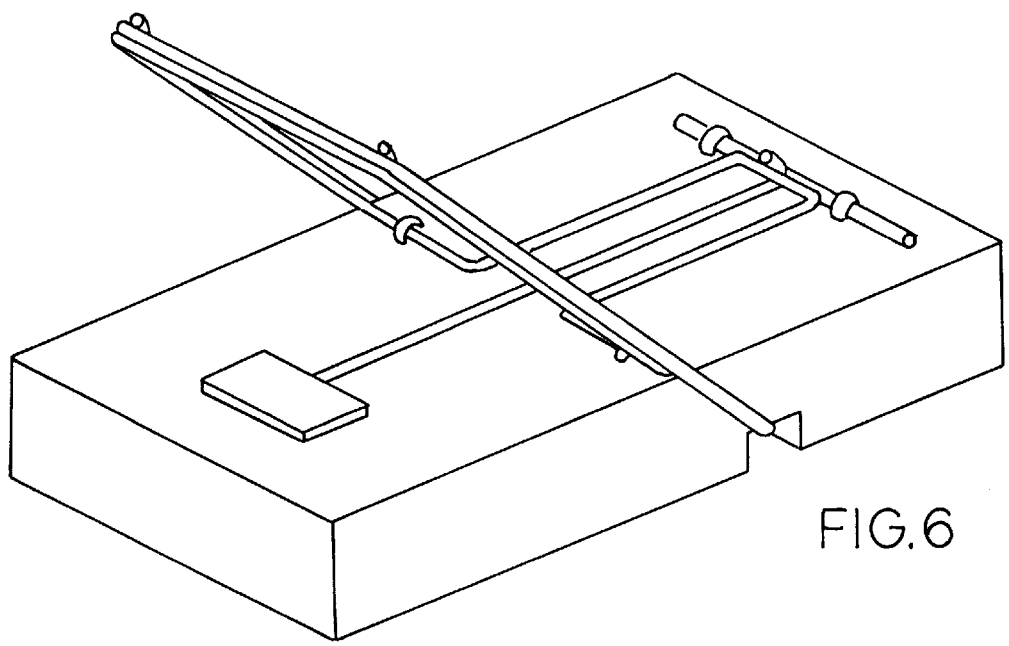
FIG. 6 is a perspective view of the device of FIG. 5 in another configuration.
Figure 7:
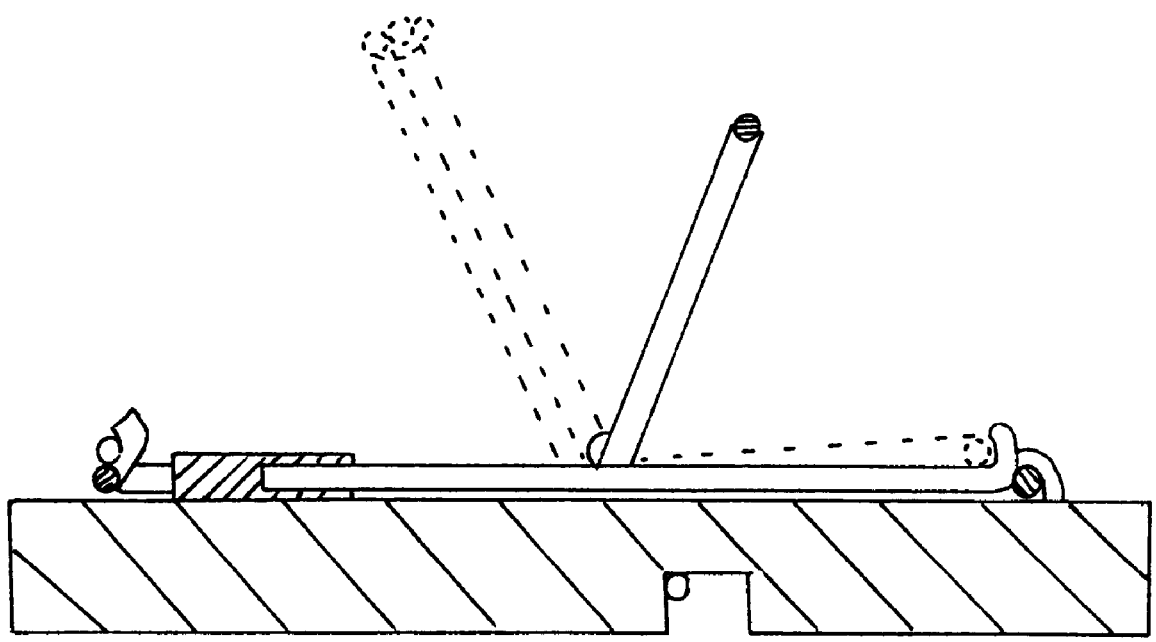
FIG. 7 is a sectional view taken on line 7—7 of FIG. 5.
Figure 8:
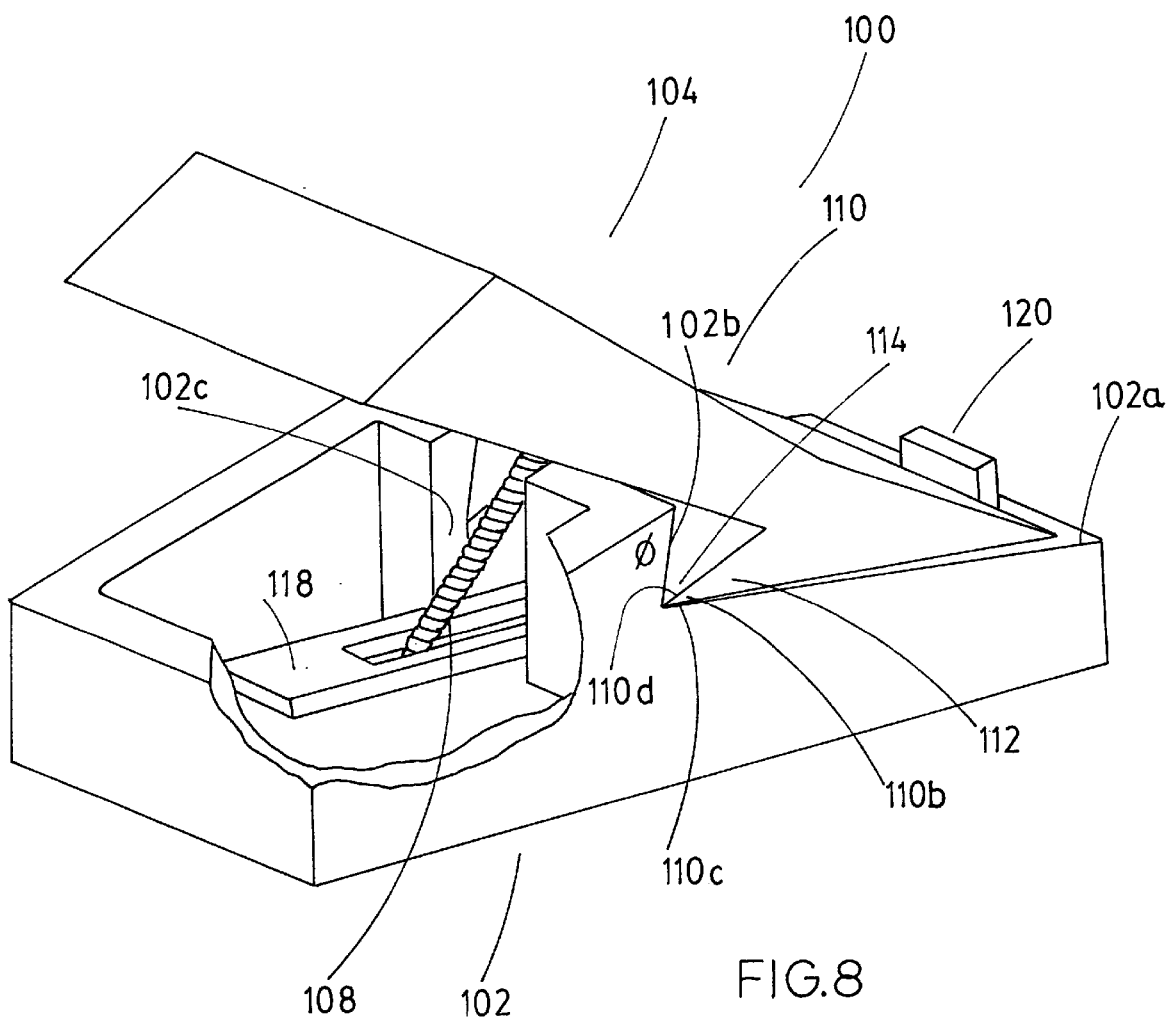
FIG. 8 is a perspective view of another device to trap a rodent.
Figure 9:
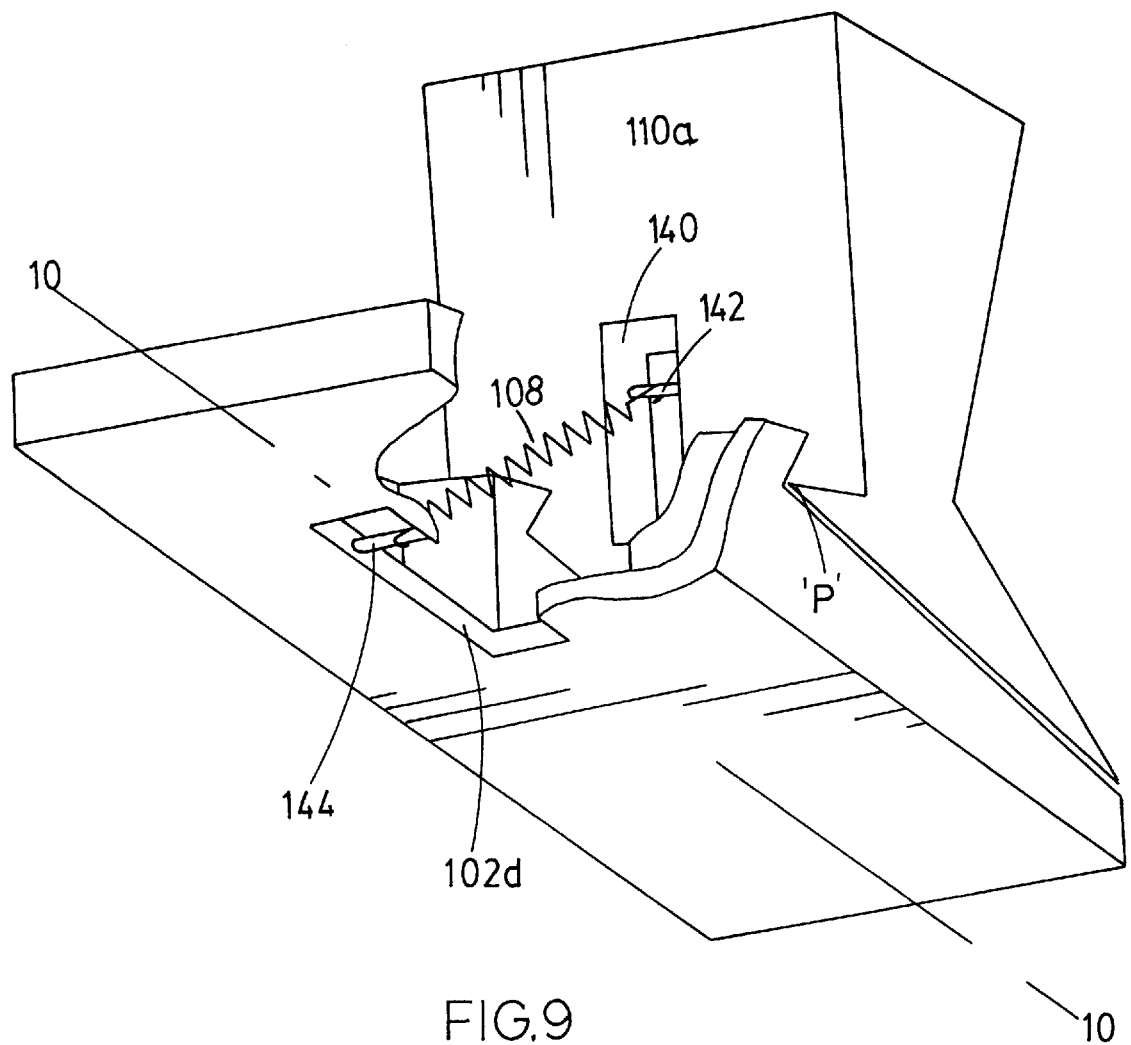
FIG. 9 is another perspective view of the device illustrated in FIG. 8.

Referring to FIGS. 5 to 7, there is provided another device 50 for trapping rodents, comprising a base 52 and a trap means generally shown at 54 movable relative to the base from a first ready position shown in FIG. 6 to a second operational position in abutment with the base at a target location thereon and as shown in FIG. 5, thereby to confine an animal between the trap means and the base.

In this case, the trap means 54 includes a trap formation 56 which is a wire formed element having a pair of longitudinal leg portions 56a and a transverse portion 56b joining one end of the portions together and which together are arranged to lie adjacent the target location in the second operational position. A pair of transverse portions 56c join the opposite ends of the leg portions 56a to a latch formation 58 with a remote second transverse portion 58a. The trap and latch formations are formed as a unitary wire formed member which is secured for pivotal movement relative to the base 52 by way of a pair of pivot elements in the form of staples 60. In this case, the second transverse portion is located opposite the first transverse portion relative to the pivot element.

A locating paddle is provided at 62 which includes an arm 66 having one end which supports a bait element locating means in the form of a locating pad 64 for the placement of bait element thereon. The arm 66 extends rearwardly toward and is joined to a retaining formation 68. In this case, the retaining formation includes a retaining hook 70 which is formed as a hooked extension of the arm 66 and which is attached to a pivot rod 72, itself secured for pivotal movement relative to the base 52 by way of a pair of staples 74.

The device 50 is further provided with a tension spring 76 which is held between a pair of hooked formations 56d on the transverse portion 56b and a transverse slot 52a in the base.

Thus, the retaining hook is provided to engage the transverse portion 58a, thereby to retain the trap formation in the first ready position as shown in FIG. 6 under the weight of the bait element positioned on the locating pad 64.

It should be borne in mind that other spring arrangements may be used to provide the same spring effect as above described. Similarly, the elements of the device may be made in different arrangements, provided that a locating formation is provided which will trip the device, when the bait element is removed therefrom or consumed in-situ.

Referring now to FIGS. 8 to 11, there is provided a device 100 to trap a rodent, comprising a base 102 and a trap means generally shown at 104 movable relative to the base from a first ready position shown in FIG. 10 to a second operational position in abutment with the base at a target location thereon and as shown in FIG. 10, thereby to confine an animal between the trap means and the base.

A spring means is generally shown at 108 in the form of a tension spring for biasing the trap means toward the second operational position. The tension spring is further arranged to reduce the bias toward zero at a rate according to the distance of the trap member from a theoretical zero position (shown in dashed lines in FIG. 10) beyond the first ready position (shown in solid lines in FIG. 10) and opposite the second operational position (shown in FIG. 11), as the trap means travels toward the first ready position, as will be described in more detail below.

The trap means includes a trap member 110 including a first portion defining a plane to be substantially parallel with the base 102 in the second operational position. The trap member has a first surface 110a to engage the base in the second operational position and includes a pivot means generally shown at 112 to pivot the trap member between the first ready position and the second operational position relative to a pivot axis. The pivot means is provided by a first edge portion on the trap member as shown at 110b which engages a pivot-receiving formation on the base 102, in the form of a corner formation generally identified by 114, itself formed by the intersection of a rearwardly declining surface 102a and an upwardly inclined surface 102b. This pivot relationship thus forms a pivot point shown at 'P' in FIG. 9.

As mentioned above, the tension spring is further arranged to reduce the bias exerted on the trap means from a maximum level when the trap means is at the second operational position toward a minimum when the trap means is at the first ready position. In this particular case, the tension spring is oriented under tension along a spring axis and the spring axis is arranged to be displaced toward a position to intersect the pivot axis in the zero position. This is illustrated in further detail in FIG. 10a, wherein the extent of the biasing force '$F_s$' exerted by the tension spring varies according to the position of the pivot point P relative to the axis of the tension spring, as defined by its anchor points $PS_1$ and $PS_2$ and defining the spring axis 'S'. In this case, if the pivot point P were to move from position $P_1$ to position $P_2$, the biasing force $F_b$ exerted on the trap member would be reduced in view of the moment arm being reduced by roughly half as shown in FIG. 10a. Similarly, if the pivot point P were to move further from position $P_2$ to position $P_3$, the biasing force $F_s$ exerted on the trap member would be substantially zero in view of the essentially zero moment arm. This latter condition is representative of the zero position.

A particular feature of the device 100 is the orientation of the corner formation 114 and the first edge portion which are shaped to inhibit premature release of the trap member from the base 102 when the trap member, as the trap member travels between the first ready position and the second operational position. The first edge portion is formed by two converging surfaces, namely 110c and 110d and the upwardly inclined surface 102b is disposed at an angle 'theta' preferably ranging from about 60 to about 89 degrees, and more preferably 85 degrees. This enables the upwardly inclined face 102b to provide a downward anchoring force to the trap member at its pivot point.

A retainer means is also provided for retaining the trap means at the first ready position. The retainer means further includes locating means which in this case includes a locating paddle 118 which is positioned in a longitudinal slot 102c in the base and in the region of the target for locating a bait element for the rodent.

Referring to FIG. 10, the retainer means further includes a retaining formation 120 and the trap member has a latch formation including a second portion, namely a latch member 128, which extends upwardly relative to the surface 110a of the trap member to engage the retaining formation when the trap member is in the first ready position. The retaining formation 120 is in the form of a trigger block 130 which is joined to the rear end of the locating paddle 118 and is pivoted to the base 102 by way of a pivot rod 132 extending transversely across the base. The pivot rod extends through a passage in the trigger block 130 and positions the block centrally in the longitudinal slot 102*c*.

The trigger block 130 has a surface which faces the latch member 128 and which is inwardly bevelled to form a notch 136 which is complementary with an edge region 128*a* on the latch member. In this manner, the trigger block 130 is pivoted to the base 102 between a load position as shown in FIG. 10 to engage the latch and retaining formations and a release position as shown in FIG. 11 to disengage the latch and retaining formations.

The trap member 110 is further provided with a passage 140 to receive one end of the tension spring 108 therein. The tension spring is held in place in the passage 140 by way of a anchor rod 142 which transversely spans the distance of the passage. In addition, the base 102 has a passage 102*d* and the locating paddle 118 has a passage 118*a* collectively to receive the other end of the tension spring 108. Similarly, the tension spring is held in place in the passage 102*d* by way of a anchor rod 144 which transversely spans the distance of the passage. The passages 140, 102*d* and 118*a* are sufficiently long to accommodate the sweep of the tension spring as the trap member 110 travels between its first ready position and its second operative position, this occurring as a result of the relative lateral travel of the anchor rods 142, 144.

In use, the device 100 is assembled in the manner described above and the trap member 110 is raised to its first ready position as shown in FIG. 10. To do so, the latch member 128 is rotated rearwardly until the edge 128*a* engages the notch 136. As the edge 128*a* passes into the notch, there will be a very slight upward movement of the locating paddle as the edge 128*a* brushes past the upper extremity of the notch 136 and then settles back down as the edge 128*a* is fully engaged by the notch 136. A bait element is then placed on the locating paddle near its remote end in readiness for an approaching rodent. As with the earlier device 10, the device 100 may be made to be highly sensitive to attempts by rodents to steal or consume the bait element in the manner described above.

Figure 13:
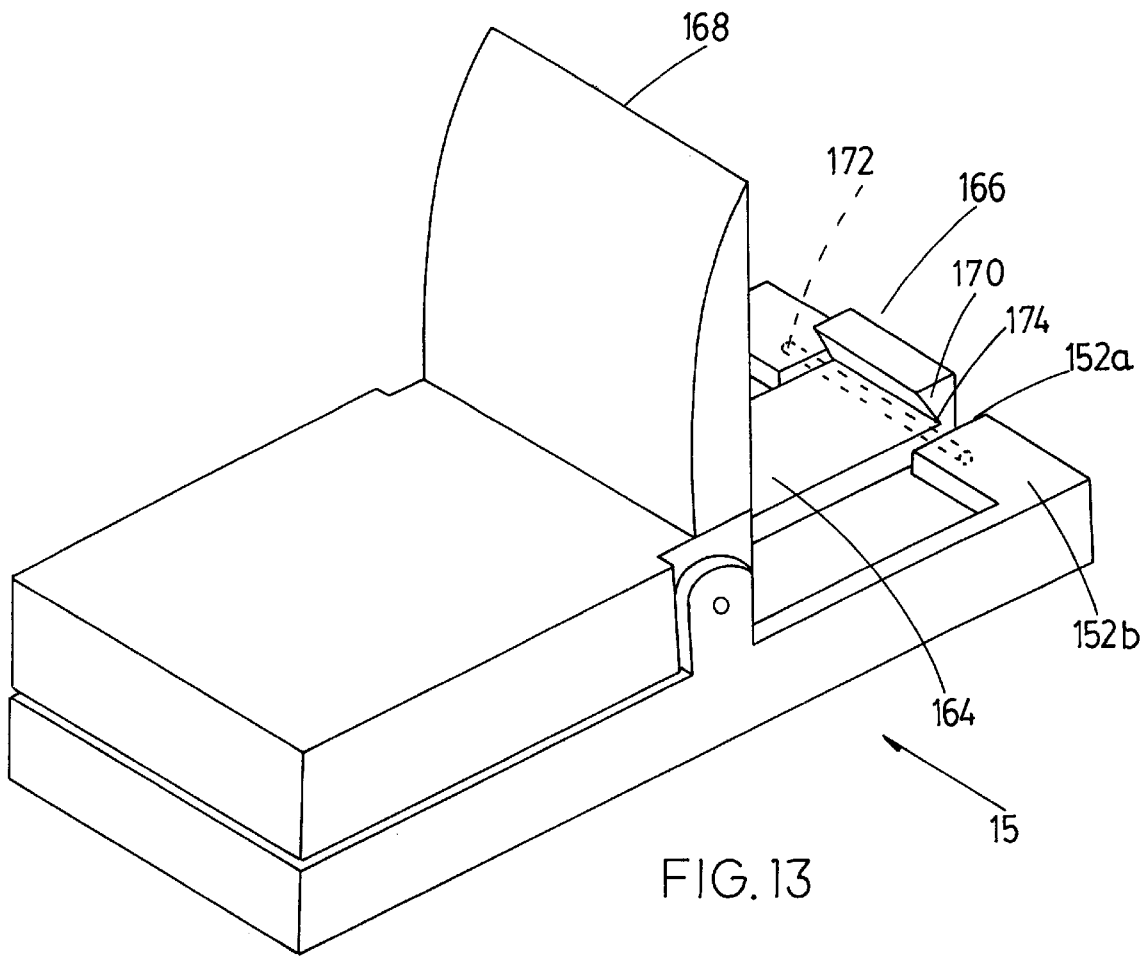
FIG. 13 is a perspective view of the device in FIG. 12 in a second operational position.
Figure 15:
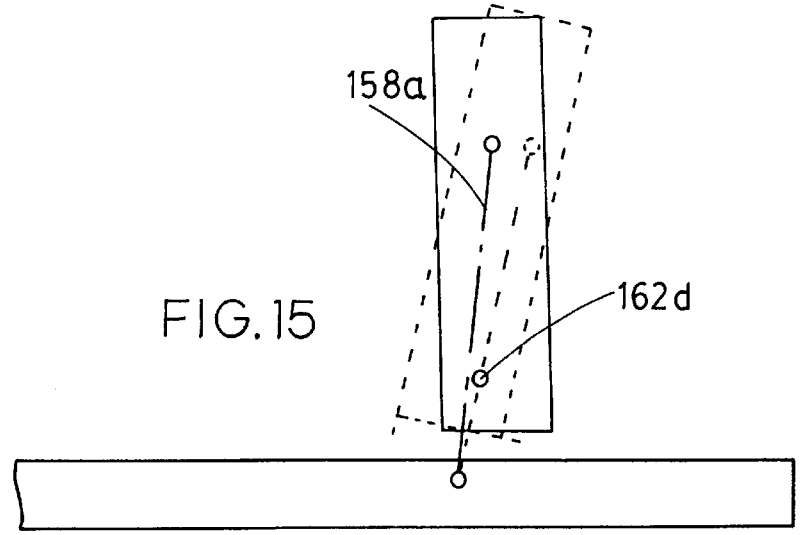
FIG. 15 is a schematic view taken on arrow 15 of FIG. 13

Referring now to FIGS. 12 to 15, there is provided a device 150 to trap a rodent, comprising a base 152 and a trap means in the form of a trap member generally shown at 154 movable relative to the base from a first ready position shown in FIG. 12 to a second operational position in abutment with the base at a target location thereon and as shown in FIG. 13, thereby to confine an animal between the trap means and the base.

A spring means is generally shown at 158 in the form of a tension spring for biasing the trap means toward the second operational position. The tension spring has a spring axis 158*a* (shown in FIG. 15) and is further arranged to reduce the bias exerted on the trap means from a maximum level when the trap means is at the second operational position toward a minimum when the trap means is at the first ready position.

The trap means includes a trap member 160 with a peripheral wall 160*a* which extends around the periphery of the trap member 160 to form a first (or abutment) surface 160*b* to engage the base 152 in the second operational position. As can be seen in FIG. 12, the peripheral wall 160*a* terminates at the boundary edges 160*c* at the rear of the trap member. Pivot means is also provided as generally shown at 162 (and shown in more detail in FIG. 14) to pivot the trap member between the first ready position and the second operational position relative to a pivot axis. The pivot means is provided by a pair of pivot flanges 162*a* each of which is positioned adjacent an outer side wall of the trap member and is further provided with engagement means for engaging the trap member therewith for pivotal movement therebetween. In this case, each pivot flange has an inwardly directed nipple 162*b* to engage a suitably dimensioned divot 162*c* formed in the side face of the trap member 160 to form a pivot axis 162*d*. Thus, the theoretical zero position would be defined by the spring axis 158*a* intersecting the pivot axis 162*d*.

A retainer means is also provided for retaining the trap means at the first ready position. The retainer means further includes locating means which in this case includes a locating paddle 164 which is positioned in a slot 152*a* formed in a rear region of a peripheral wall 152*b* which extends around the periphery of the base 152 to form a contact surface for the first surface 160*b*. As with the earlier embodiment, the locating paddle is located in the region of the target for locating a bait element for the rodent.

Referring to FIG. 13, the retainer means further includes a retaining formation 166 and the latch formation includes a latch member 168 which extends upwardly at a substantially right angle relative to the surface 160*b* of the trap member to engage the retaining formation when the trap member is in the first ready position. The retaining formation 166 is in the form of a trigger block 170 which is joined to the rear end of the locating paddle 164 and is pivoted to the base 152 by way of a pivot rod shown in dashed lines at 172 and extending transversely across the base and into the peripheral wall 152*b*. The pivot rod extends through the trigger block and positions the block centrally in the longitudinal slot 152*a*.

The trigger block 170 has a surface which faces the latch member 168 and which is inwardly bevelled to form a notch 174 which is complementary with an edge region 168 on the latch member. In this manner, the trigger block 170 is pivoted to the base 152 between a load position as shown in FIG. 12 to engage the latch and retaining formations and a release position as shown in FIG. 13 to disengage the latch and retaining formations.

The locating paddle 164 is further provided with a passage 164*a* which is aligned with a similarly shaped passage 152*c* formed in the base 152 to receive one end of the tension spring 158 therethrough. Anchor means are provided for anchoring one end of the tension spring to the base and the other end of said tension spring to the trap member. In this case, the anchor means includes an anchor rod 176 which transversely spans the distance of the passage 152*c* to hold the tension spring is held in place therein. The other end of the tension spring 158 is held in the trap member 160 by way of an anchor rod 178 which transversely spans the distance between the opposite portions of the peripheral wall 160*a*. The passage 164*a* is sufficiently long to accommodate the sweep of the tension spring as the trap member 110 travels between its first ready position and its second operative position.

While, in the immediately preceding embodiment, the latch member 168 extends upwardly at a substantially right angle relative to the surface 110*a* of the trap member, it will be understood that the latch member 168 may be oriented at angles other than a substantially right angle depending on the dimensions of the components and the size of the opening formed between the trap member and the base member in the first ready position. While the pivot means has been shown in the form of a nipple and divot arrangement, it will be understood that other pivot arrangements may also be used such as a slot formed in the pivot flange 162 as shown in dashed lines at 180 in FIG. 12 and a pivot rod extending through the wall 160a and the slot.

Figure 16:
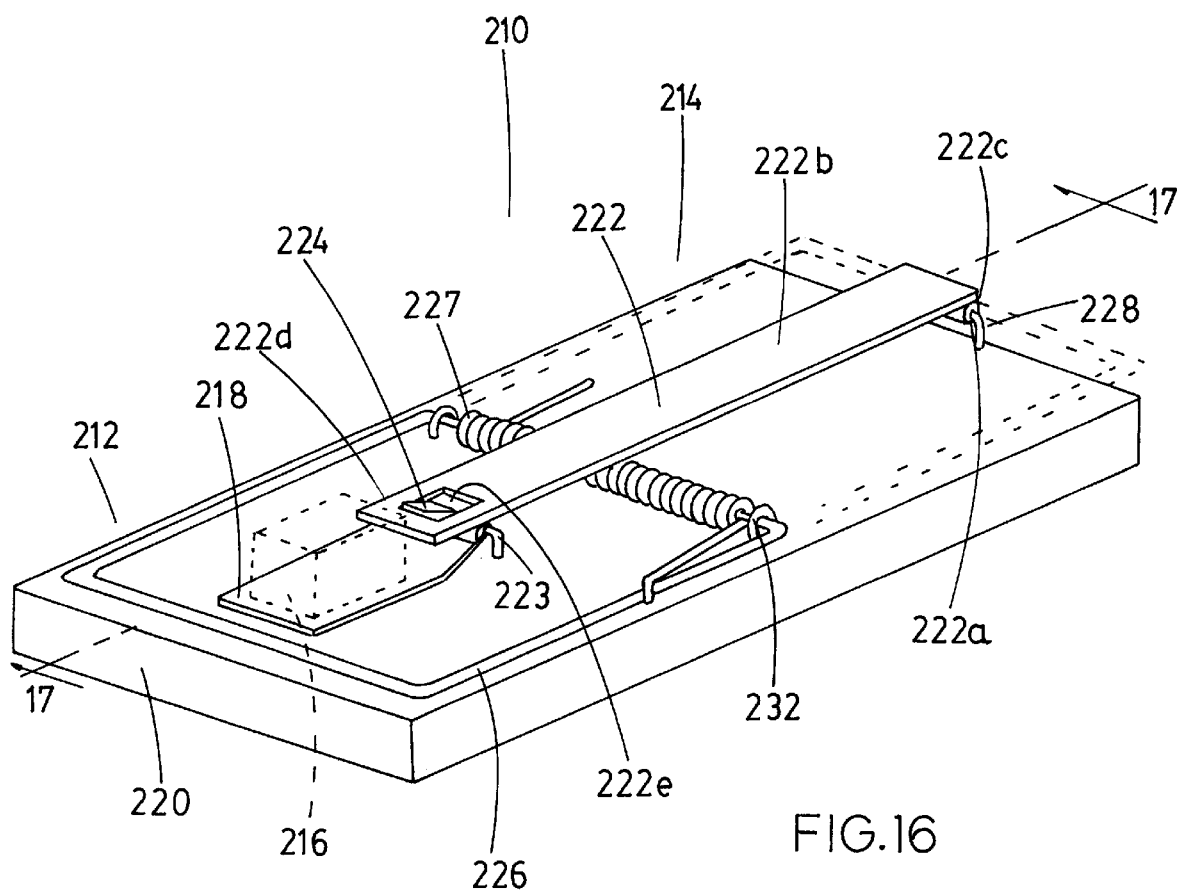
FIG. 16 is a fragmentary perspective view of a still another device to trap a rodent.
Figure 17:
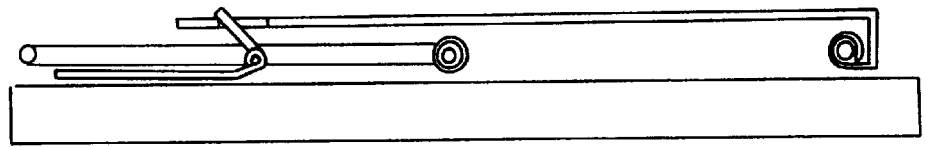
FIG. 17 is a sectional view taken on line 17—17 of FIG. 16.

Referring to FIGS. 16 to 21, there is provided a device 210 to trap a rodent comprising spring biased trap means 212 movable from a first ready position shown in dashed lines in FIG. 16 to a second operational position as shown by solid lines to confine a rodent. As will be described below, retainer means is also provided at 214 to retain the trap means in the first position under the action of a downward retaining force, the retainer means being arranged to receive a bait element as shown in dashed lines at 216. The retainer means is further arranged so that the downward retaining force is equivalent to and is provided by the weight of the bait element.

The retaining means 214 includes a locating paddle 218 pivotally connected to a base 220 in a target region for the rodent and arranged to carry the bait element 216 thereon and the retaining means further includes a retaining arm 222 pivotally connected to the base 220.

The locating paddle 218 is pivotally connected to the base 220 by way of a shank member 223 and includes a flange 224 to retain the arm with the trap means 212 in the first ready position under the downward retaining force $F_B$ which is equivalent to and is provided by the weight of the bait element 216.

The trap means 212 includes a hoop member 226 rotatably anchored to the base 220. The arm 222 is pivotally connected to the base 220 by way of a shank member 228, the arm having an anchor end 222a which is looped to engage the shank member. In this particular case, the shank member is a staple-type anchor (also referred to herein below simply as a staple). The arm has a planar portion 222b which is offset from the shank member and arranged to extend through the path of travel of the trap means between the first ready and second operable positions.

The arm 222 further includes an offset portion 222c joining the planar portion with the anchor end, the offset portion 222c being sufficiently long and arranged with the arm and the anchor end to form a region 230 to receive the hoop member 226 when the trap means is in the first ready position. The arm is further provided with a free end 222d with a passage 222e formed therein to engage the flange 224.

The hoop member is generally U-shaped and is pivoted to the base by way of another staple shown at 232. The hoop member has loops formed in its two free ends as shown at 226a to entrain the staple. Also held on the staple is a spring means in the form of a torsion spring 227 for biasing the trap means toward the second operational position.

Figure 18:
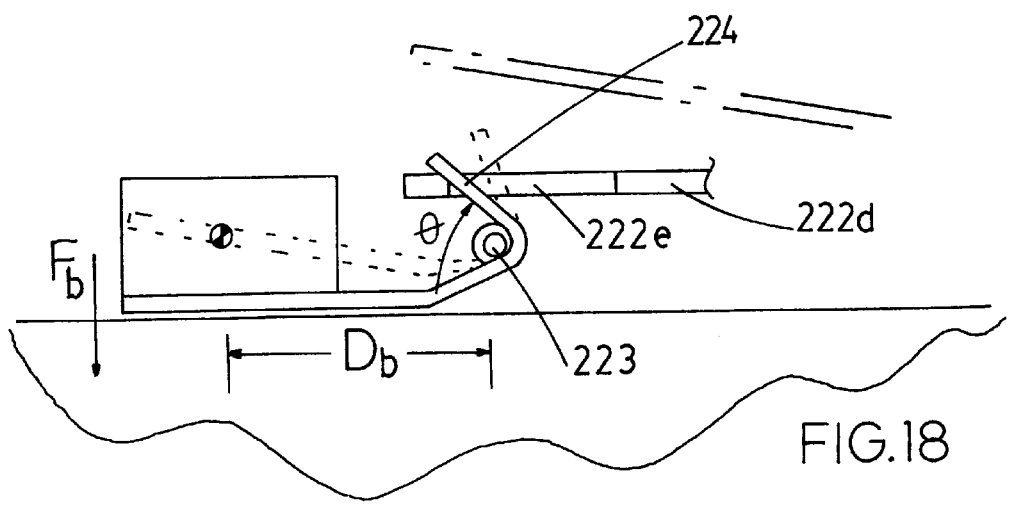
FIG. 18 is a magnified fragmentary sectional view of a portion of the device illustrated in FIG. 16.
Figure 19:
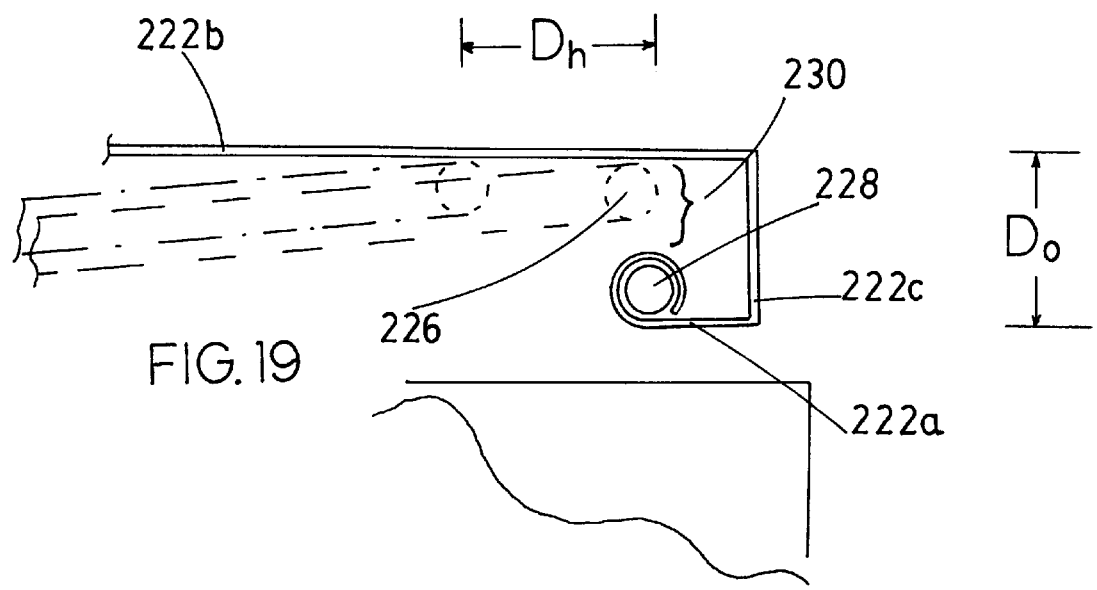
FIG. 19 is a magnified fragmentary sectional view of a portion of the device illustrated in FIG. 16.

As shown in FIGS. 18 and 19, a particular feature of the device 210 is the position of the hoop member which is just slightly off a position directly above the shank member 228 in the first ready position. This means that there is a minimal moment generated by the hoop member in its first ready position relative to the pivot axis formed by the shank member 228 and there is a corresponding small force exerted by the hoop member in its first ready position against the arm 222. As a result, a relatively small force is exerted on the locating paddle by the arm and the locating paddle is in turn able to maintain the retaining formation in its first ready position with a correspondingly small downward force $F_B$, conveniently provided by the weight of the bait element.

The spring rate of the torsion spring and the dimensions of the hoop member, the arm, the flange and the locating paddle should be arranged so that the force required to maintain the locating paddle in position does not exceed the weight of the bait element, such as for example a fraction of one ounce. This will allow a relatively small bait element of the same weight to be used positioned on the locating paddle In use, the device 210 is assembled in the manner described above and the hoop member is raised to its first ready position as shown in dashed lines in FIG. 16, with the hoop member above the shank member 228 and the flange 224 in position through the passage 222e. A bait element is selected with sufficient weight to maintain the retaining formation in its first ready position and is then placed on the locating paddle near its remote end in readiness for an approaching rodent. As the rodent consumes or removes the bait element, the downward retaining force $F_B$ will be reduced or removed causing the upward force exerted on the locating paddle to displace the locating paddle upwardly as shown in dashed lines in FIG. 18. This in turn causes the flange to be released from the passage 222e and the hoop member to be released from the arm and to swing to its second operational position, thereby trapping the rodent.

It will be seen that the successful trapping of a rodent using the device 210 does not depend on the rodent actually downwardly displacing a trigger to activate a trap, for in those cases the rodent may be able to very gently remove the bait without disturbing the trigger. In this case, the partial consumption or the removal of the bait element from the locating paddle is all that is necessary since, in both cases, the upward force (exerted on the locating paddle by the torsion spring via the hoop member and the arm) overcomes the remaining downward retaining force $F_B$ thereby leaving the locating paddle to displace upwardly under the upward force being exerted thereon by the torsion spring through the hoop member, the arm and the flange 224.

If desired, the hoop member may be located farther away from the shank member, that is the distance $D_H$ may be increased, which should tend to increase the force being exerted on the locating paddle, thereby requiring a bait element with a greater predetermined weight. Changes in the length of the offset portion, that is the distance $D_o$ should also affect the force being exerted on the locating paddle. For example, reducing the distance $D_o$, should tend to increase the force being exerted on the locating paddle, thereby requiring a bait element with a greater predetermined weight. Similarly, as shown in FIG. 18, the relative angle 'theta' of the flange 224 to the locating paddle may be decreased which should further tend to increase the force being exerted on the locating paddle. Changes in the spring rate of the torsion spring should have a corresponding influence on the force being exerted on the locating paddle. Changes in the distance of the centre of gravity of the bait element from the shank member 223 as shown by the dimension $D_B$ in FIG. 18 will also influence the effect of the downward retaining force, that is by increasing the moment arm of the downward retaining force $F_B$ relative to the moment arm of the upward force being exerted against the flange by the arm.

Figure 20:
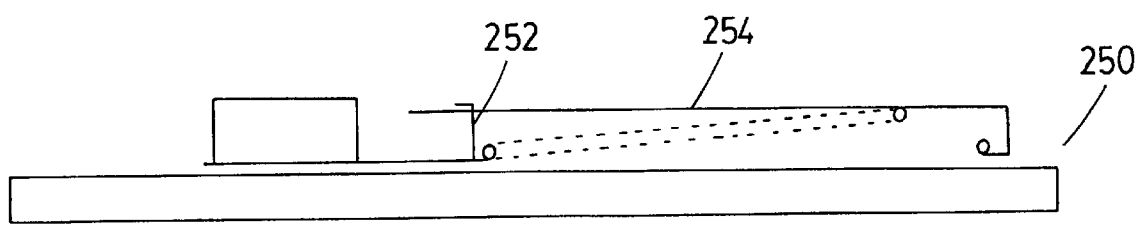
FIG. 20 is a schematic side view of another device to trap a rodent.
Figure 21:
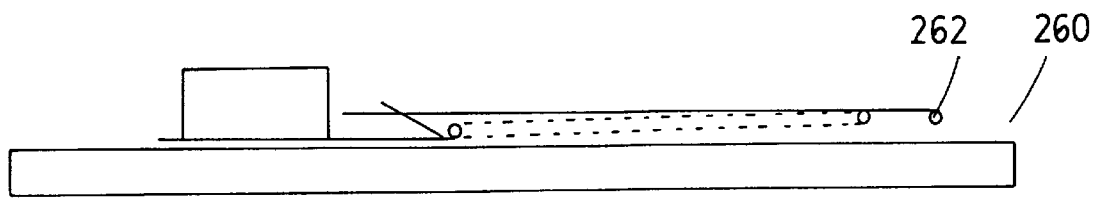
FIG. 21 is a schematic side view of still another device to trap a rodent.

Two alternative arrangements are shown, for example, in FIGS. 20 and 21. In the case of FIG. 20, the device 250 has a flange 252 which is substantially right angled to engage the top surface of the arm 254, both of which are shown separated for the sake of illustration. In the case of FIG. 21, the device 260 has an arm which is pivoted to a shank member 262 without the use of the offset portion.

Figure 23:
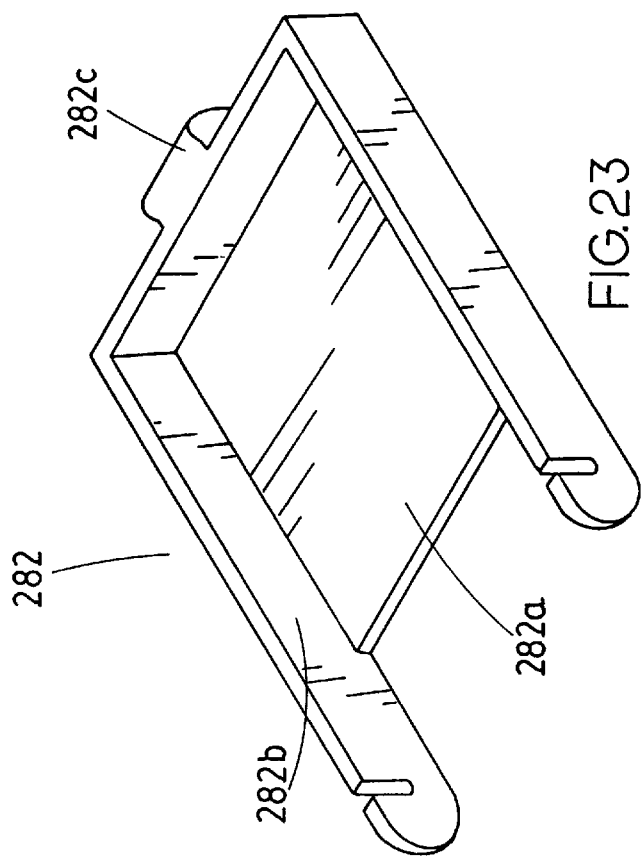
FIG. 23 is a perspective view of one portion of the device shown in FIG. 22.
Figure 24:
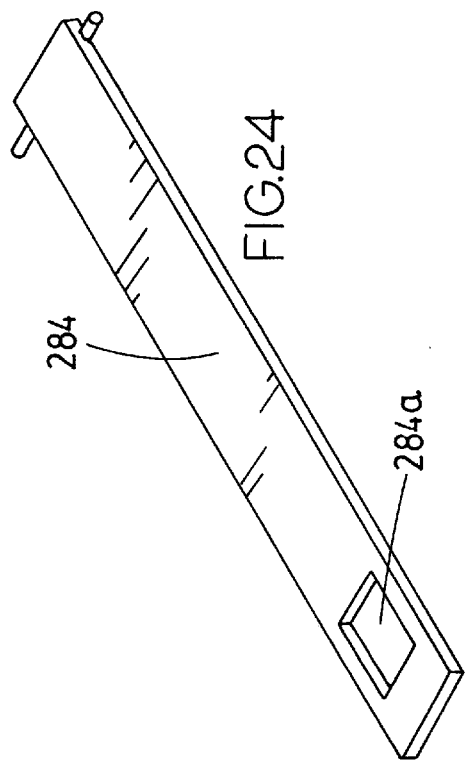
FIG. 24 is a perspective view of one portion of the device shown in FIG. 22.
Figure 25:
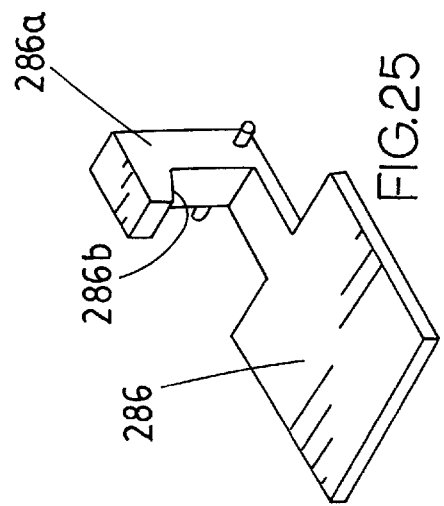
FIG. 25 is a perspective view of one portion of the device shown in FIG. 22.

Still another device to trap a rodent is shown at 280 in FIGS. 22 to 25 which works in a manner substantially the same as the device 210 shown above. In this case, however, the hoop member 282, the arm 284 and the locating paddle 286 are each a single molded element as shown in FIGS. 23 to 25 respectively. In the case of the hoop member 282, it is provided with a central panel 282a and a pair of arms 282b extending along the periphery thereof. The device 280 has a base 288 with three pairs of upstanding posts 290, 292 and 294. The posts 290 are arranged for pivotally mounting the locating paddle 286 by way of a pivot pin 296 extending through aligned passages in the locating paddle 286 and the posts 294. The posts 292 are arranged for pivotally mounting and the hoop member 282 by way of a pivot pin 298 which also secures the torsion spring 300 in position with one leg 300a beneath the panel 282a to deliver a spring force to the hoop member. Similarly, the posts 294 are arranged for pivotally mounting the arm 284 by way of a pivot pin 302 extending through aligned passages in the posts 294 and the arm 284. As can be seen in FIG. 23, the free ends of the arms 282b may be formed with notches for engaging the pivot pin 298.

The locating paddle 286 has an upstanding lip 286a to extend through a passage 284a in the arm 284. Referring to FIG. 25, The upstanding lip is also provided with an indented edge region 286b to engage a portion of the arm in the periphery of the passage 284a.

Figure 22:
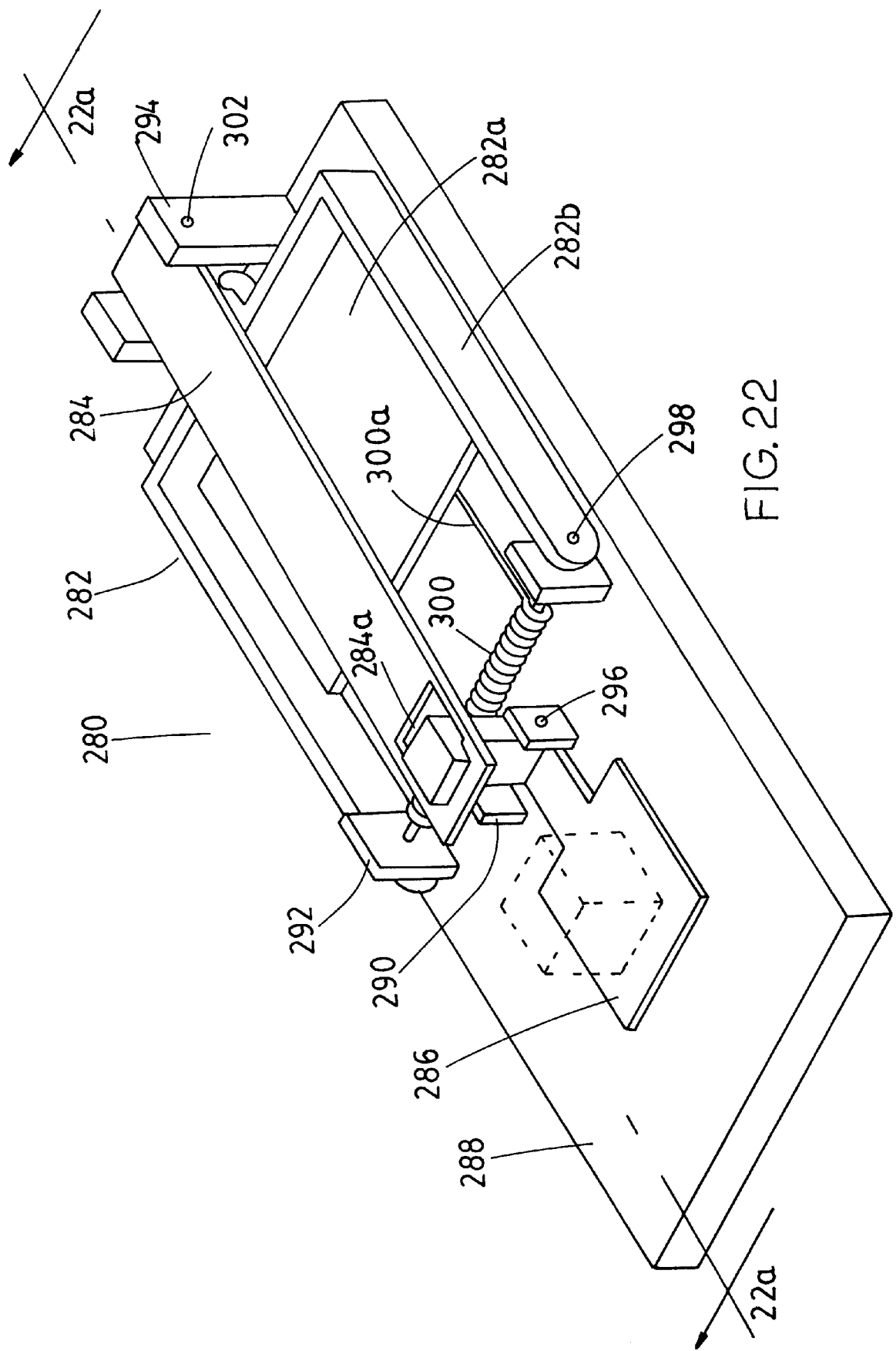
FIG. 22 is a perspective view of a yet another device to trap a rodent.
Figure 22A:
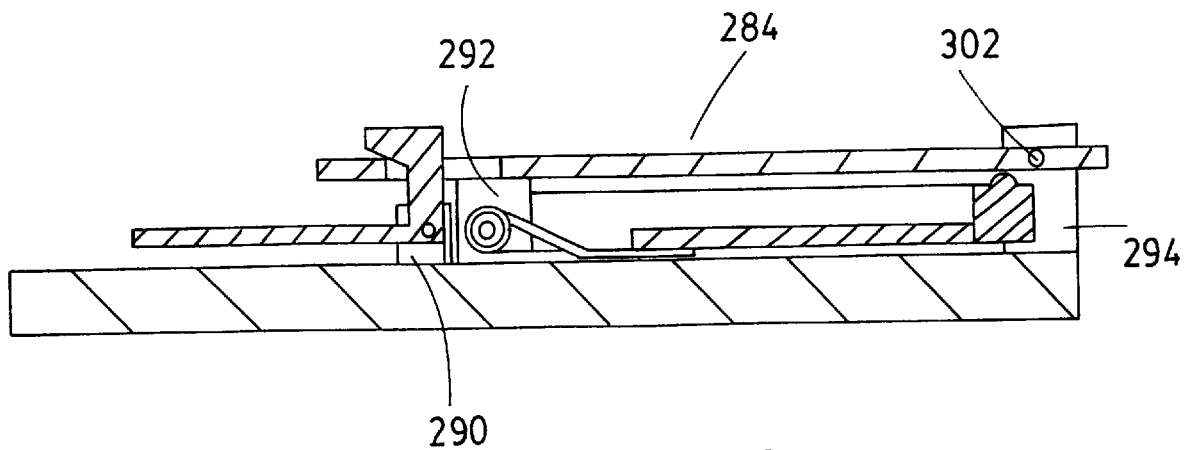
FIG. 22a is a sectional view taken on line 22a—22a of FIG. 22.

As shown in FIG. 22a, the pivot 302 is positioned above the arm 284 and the hoop member is also provided with a rear extension portion 282c to extend below and engage the arm in a position which is misaligned with the pivot pin 302. The portion 282c is also provided with a raised surface to seat against the lower surface of the arm.

Following the general operating principles of the earlier embodiments, and in particular device 212, the extent of the misalignment and the pivot pin 302 will influence the extent of the forces being exerted on the arm by the spring through the hoop member. Similarly, the degree of the force needed to be exerted by the bait element, and as a consequence the needed weight of the bait element, will be influenced by the angle of the indented edge region 286b, the spring rate of the torsion spring as well as by other factors common to this device and those described hereinabove.

While several preferred embodiments of the invention have been described in detail above, it will be appreciated that the invention is not limited to the specific features disclosed herein. Numerous modifications can be made within the scope of the invention as defined in the appended claims.

We claim:

1. A device to trap a rodent comprising spring biased trap means movable from a first ready position to a second operational position to confine a rodent, retainer means to retain said trap means in said first position under the action of a downward retaining force, said retainer means being arranged to receive a bait element, said retainer means being further arranged so that said downward retaining force is equivalent to and provided by the weight of said bait element.

2. A device as defined in claim 1 wherein said retaining means includes a locating paddle to define a target region and arranged to carry said bait element thereon.

3. A device as defined in claim 2 wherein said retaining means further includes a retaining arm pivotally connected to said base.

4. A device as defined in claim 3 wherein said locating paddle includes a flange to retain said arm with said trap means in said first ready position under the biasing force of said bait element.

5. A device as defined in claim 4 wherein said device includes a base, said trap means includes a hoop member rotatably anchored to said base.

6. A device as defined in claim 5 wherein said arm is pivotally connected to said base by way of a shank member, said arm having an anchor end which is looped to engage said shank member.

7. A device as defined in claim 6 wherein said arm has a planar portion which is arranged to extend through the path of travel of said trap means between said first ready and second operable positions, said planar portion being offset from said shank member.

8. A device as defined in claim 7 wherein said arm further includes an offset portion joining said planar portion with said anchor end, said offset portion being sufficiently long and arranged with said arm and said anchor end to form a region to receive said hoop member when said trap means is in said first ready position.

9. A device as defined in claim 4 wherein said arm has a free end with a passage formed therein to engage said flange.

10. A method of trapping a rodent comprising the steps of:

providing a spring biased trap movable from a first ready position to a second operational position to confine a rodent, providing a retainer to retain said trap in said first position under the action of a downward retaining force, arranging said retainer to receive a bait element;

further arranging said retainer so that said downward retaining force is equivalent to the weight of said bait element.

11. A method as defined in claim 10 wherein said step of providing a retainer includes the steps of providing a locating paddle to define a target region and arranging said locating paddle to carry said bait element thereon.

12. A method as defined in claim 11 wherein said step of providing a retainer includes the step of providing a retaining arm pivotally connected to said base.

13. A method as defined in claim 12 further comprising the step of providing said locating paddle with a flange to retain said arm with said trap means in said first ready position under the biasing force of said bait element.

14. A method as defined in claim 13 further comprising the steps of providing a base and providing said trap means in the form of a hoop member; and rotatably anchoring said hoop member to said base.

15. A method as defined in claim 14 further comprising the steps of pivotally connecting said arm to said base by way of a shank member; and providing said arm with an anchor end which is looped to engage said shank member.

16. A method as defined in claim 15 further comprising the steps of providing said arm with a planar portion; and arranging said planar portion to extend through the path of travel of said trap means between said first ready and second operable positions; and offsetting said planar portion relative to said shank member.

17. A method as defined in claim 16 further comprising the steps of joining said planar portion and said anchor end with an offset portion; and providing said offset portion with sufficiently length to form a region to receive said hoop member when said trap means is in said first ready position.

18. A method as defined in claim 14 further comprising the step of providing said arm with a free end having a passage formed therein to engage said flange.

* * * * *